(12) United States Patent
Wu

(10) Patent No.: US 9,494,175 B2
(45) Date of Patent: Nov. 15, 2016

(54) CLIPPING DEVICE

(71) Applicant: Race Wu, Taichung (TW)

(72) Inventor: Race Wu, Taichung (TW)

( * ) Notice: Subject to any disclaimer, the term of this patent is extended or adjusted under 35 U.S.C. 154(b) by 51 days.

(21) Appl. No.: 14/607,931

(22) Filed: Jan. 28, 2015

(65) Prior Publication Data

US 2015/0211554 A1  Jul. 30, 2015

(30) Foreign Application Priority Data

Jan. 29, 2014  (TW) .............................. 103202064 U

(51) Int. Cl.
*F16B 2/10* (2006.01)
(52) U.S. Cl.
CPC .............. *F16B 2/10* (2013.01); *Y10T 24/4453* (2015.01); *Y10T 24/44385* (2015.01)
(58) Field of Classification Search
CPC . F16B 2/10; G03B 17/561; Y10T 24/44333; Y10T 24/4453; Y10T 24/13; Y10T 24/1394; Y10T 24/1391; Y10T 24/244291; Y10T 24/4427; Y10T 24/45403; Y10T 24/45414; Y10T 24/44538; A45F 5/021; E05C 1/085; E05B 17/0037; E05B 63/20; E05B 63/202; Y10S 292/63; Y10S 292/37

USPC .......... 224/667; 292/95, 137, 138, 145, 163, 292/175, 177

See application file for complete search history.

(56) References Cited

U.S. PATENT DOCUMENTS

2007/0296225 A1*  12/2007  Ashton ................... E05B 13/10
                                                                   292/163

* cited by examiner

*Primary Examiner* — Robert J Sandy
*Assistant Examiner* — Michael Lee
(74) *Attorney, Agent, or Firm* — Muncy, Geissler, Olds & Lowe, P.C.

(57) ABSTRACT

A clipping device includes a first arm having a body portion that includes a connecting portion and a fastener at two ends thereof, respectively; a second arm having a body portion that includes a connecting portion and a fastener-receiving portion at two ends thereof, respectively, wherein the connecting portion is connected to the connecting portion of the first arm; and a lock assembly having a fastener removably engaged with the fastener of the first arm and a switch being shiftable between a first position and a second position. When the switch is at the first position, the fastener of the lock assembly is displaceable, and when the switch is at the second position, the fastener of the lock assembly is not displaceable.

1 Claim, 6 Drawing Sheets

CLIPPING DEVICE

BACKGROUND OF THE INVENTION

1. Technical Field

The present invention relates to tools for removably holding things together, and more particularly to a clipping device.

2. Description of Related Art

With the improvement of living standards, cigars as a relatively expensive A conventional clipping device comprises a first arm having a body portion that includes a connecting portion and a fastener at two ends thereof; a second arm having a body portion that includes a connecting portion and fastener-receiving portion at two ends thereof, wherein the connecting portion is connected to the connecting portion of the first arm; a lock assembly having a fastener removably engaged with the fastener of the first arm.

However, in the conventional clipping device, when the fastener of the lock assembly is engaged with the fastener of the first arm, there is no securing designs to prevent the fastener of lock assembly and the fastener of the first arm from accident disengagement caused by unintentional operation, and the risk that articles supposed to be held by the clipping device fall and separate exists.

Therefore, the conventional clipping device needs to be improved.

BRIEF SUMMARY OF THE INVENTION

In view of this, the primary objective of the present invention is to provide a clipping device, which ensures the engagement between the fastener of the lock assembly and the fastener of the first arm.

For achieving the foregoing objective, the disclosed clipping device comprises a first arm having a body portion that includes a connecting portion and a fastener at two ends thereof, respectively; a second arm having a body portion that includes a connecting portion and a fastener-receiving portion at two ends thereof, respectively, wherein the connecting portion is connected to the connecting portion of the first arm; and a lock assembly having a fastener movably engaged with the fastener of the first arm, and a switch configured to shift between a first position and a second position, wherein when the switch is at the first position, the fastener of the lock assembly is displaceable, and when the switch is at the second position, the fastener of the lock assembly is not displaceable.

Thereby, with the operation of the switch, the engagement between the fastener and the lock assembly and the fastener of the first arm can be locked and prevented from release or unlocked and allowed to release.

The present invention will be described with reference to the preferred embodiment in conjunction with the accompanying drawings and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

DETAILED DESCRIPTION OF THE INVENTION

Figure 1:
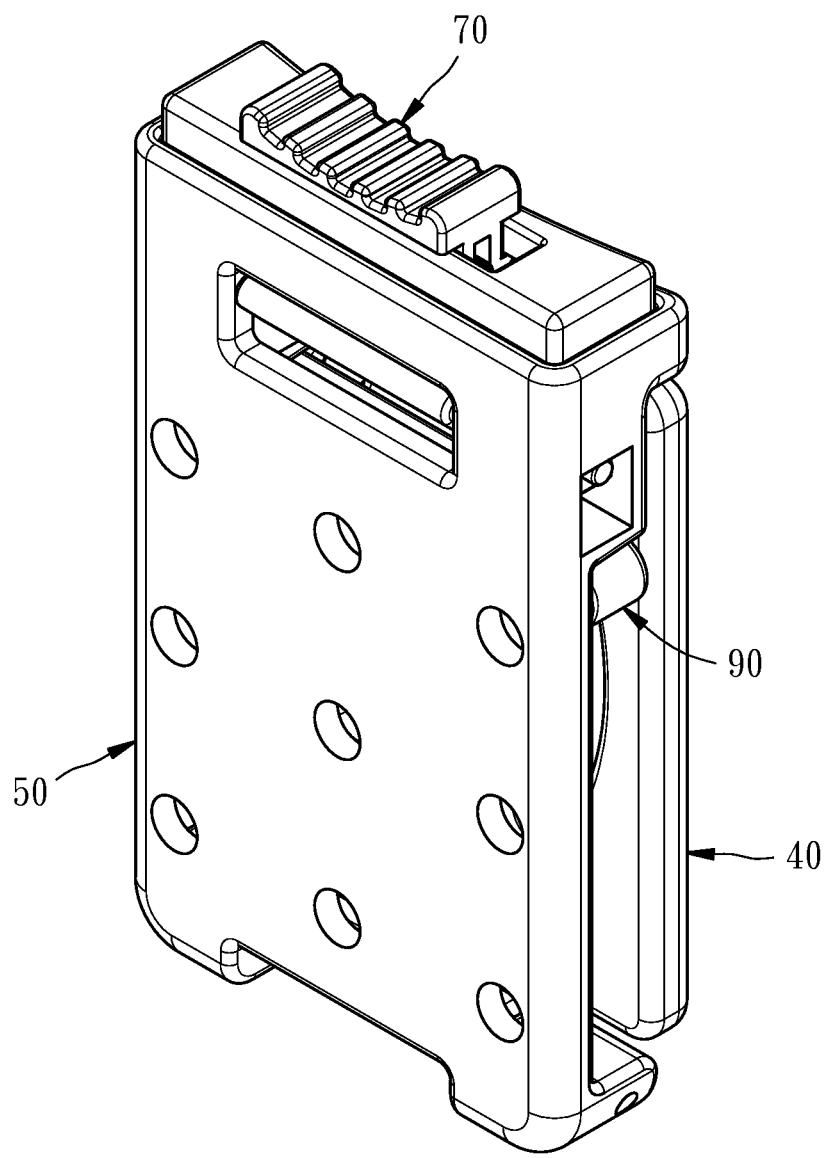
FIG. 1 is a perspective view of a preferred embodiment of the present invention.

The following description will refer to a specific embodiment and accompanying drawing to illustrate the technical features of the present invention in detail.

It is to be stated at first that throughout the specification all the directional expressions, such as inner, outer, upper and lower are defined with reference to the directions in the drawings.

Figure 2:
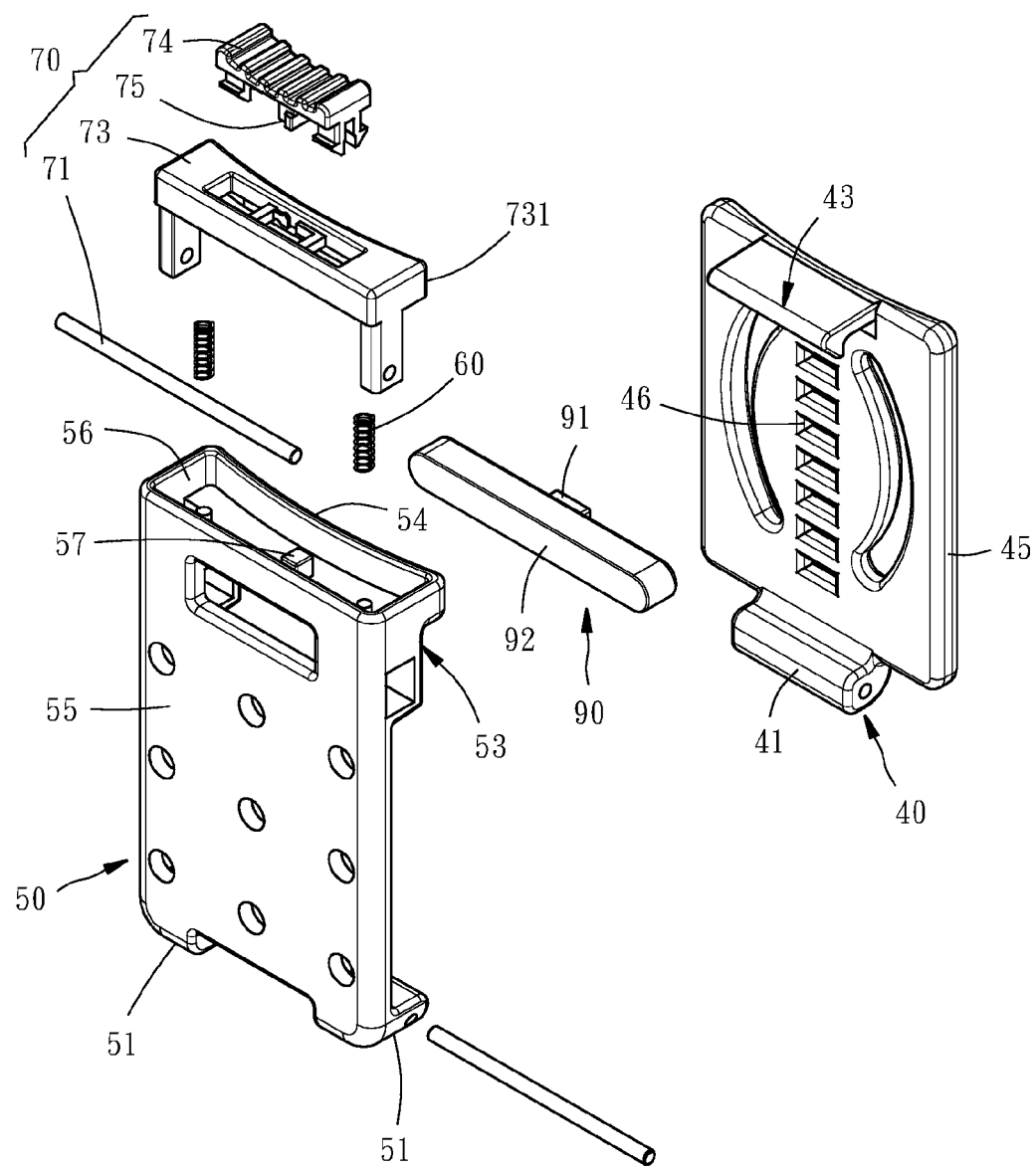
FIG. 2 is an exploded view of the preferred embodiment of the present invention.
Figure 3:
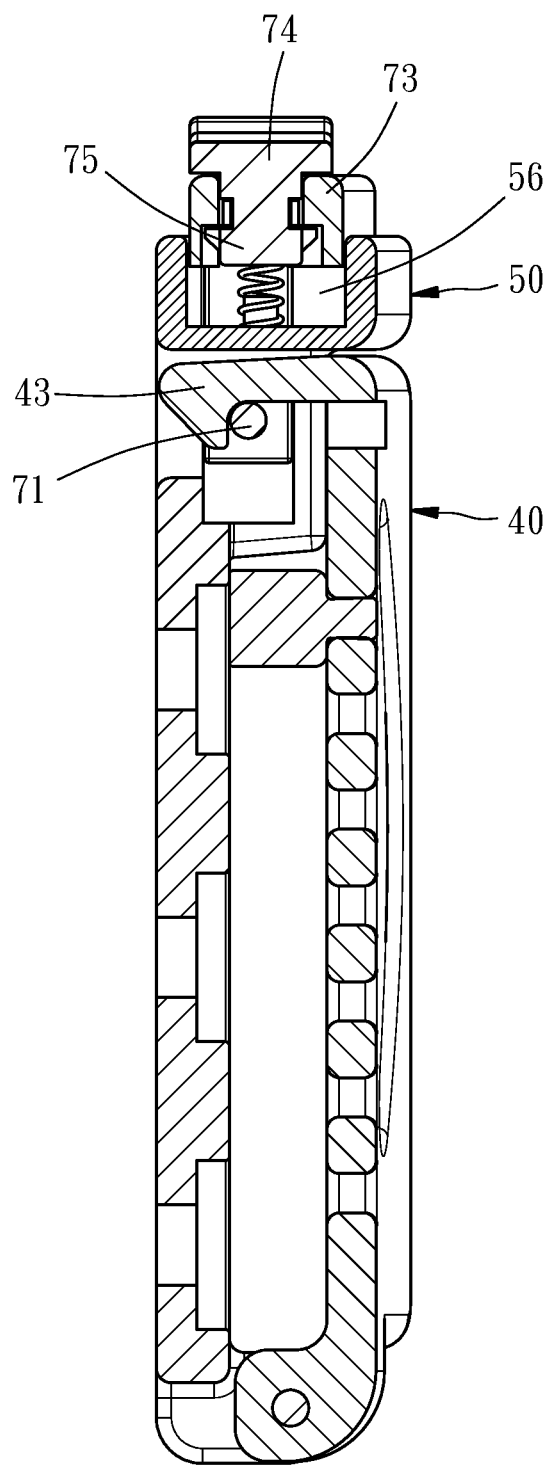
FIG. 3 is a cross-sectional view of the preferred embodiment of the present invention.

Referring to FIG. 1 through FIG. 3, in one preferred embodiment of the present invention, a clipping device 30 comprises a first arm 40, a second arm 50, and a lock assembly 70.

The first arm 40 has a connecting portion 41, a fastener 43 and a body portion 45 connecting the connecting portion 41 and the fastener 43. In the present embodiment, the fastener 43 is a hook integratedly formed on the body portion 45.

The second arm 50 has a connecting portion 51 pivotally connected to the connecting portion 41, a fastener-receiving portion 53, a body portion 55 connected between the connecting portion 51 and the fastener-receiving portion 53, and a receiving recess 56 formed on the fastener-receiving portion 53. In addition, the second arm 50 has a first stopper 57 deposited on the fastener-receiving portion 53.

The lock assembly 70 has a shaft that acts as a fastener 71, a linking member 73 connected to the fastener 71, a switch 74 such mounted on the linking member 73 that it can shift between a first position P1 and a second position P2 on the linking member 73, and a second stopper 75 that is driven by the switch 74. In other words, the linking member 73 can drive the fastener 71 to move, and the switch 74 is shiftably mounted on the linking member 73.

Therein, the lock assembly 70 is installed into the receiving recess 56 through the fastener-receiving portion 53 of the second arm 50, and the linking member 73 is also installed in the receiving recess 56.

The clipping device 30 further comprises two springs 60 that prop between the linking member 73 of the lock assembly 70 and the fastener-receiving portion 53 of the second arm 50. The springs 60 are installed in the receiving recess 56 of the second arm 50. The first stopper 57, the switch 74 and the second stopper 75 are located between the two springs 60. The second arm 50 has a circumferential wall 54 surrounding the receiving recess 56. The first stopper 57 is provided on a bottom surface of the receiving recess 56. The linking member 73 has a cap 731 located within the circumferential wall 54. The second stopper 75 is located below the cap 731.

In addition, the clipping device 30 has a spacer 90 arranged between the first arm and the second arm. The first arm is provided with a plurality of spacer sockets 46 for the spacer 90 to selectively engage with.

Based on the present embodiment, the operation and effects of the present invention will be described below.

Figure 4:
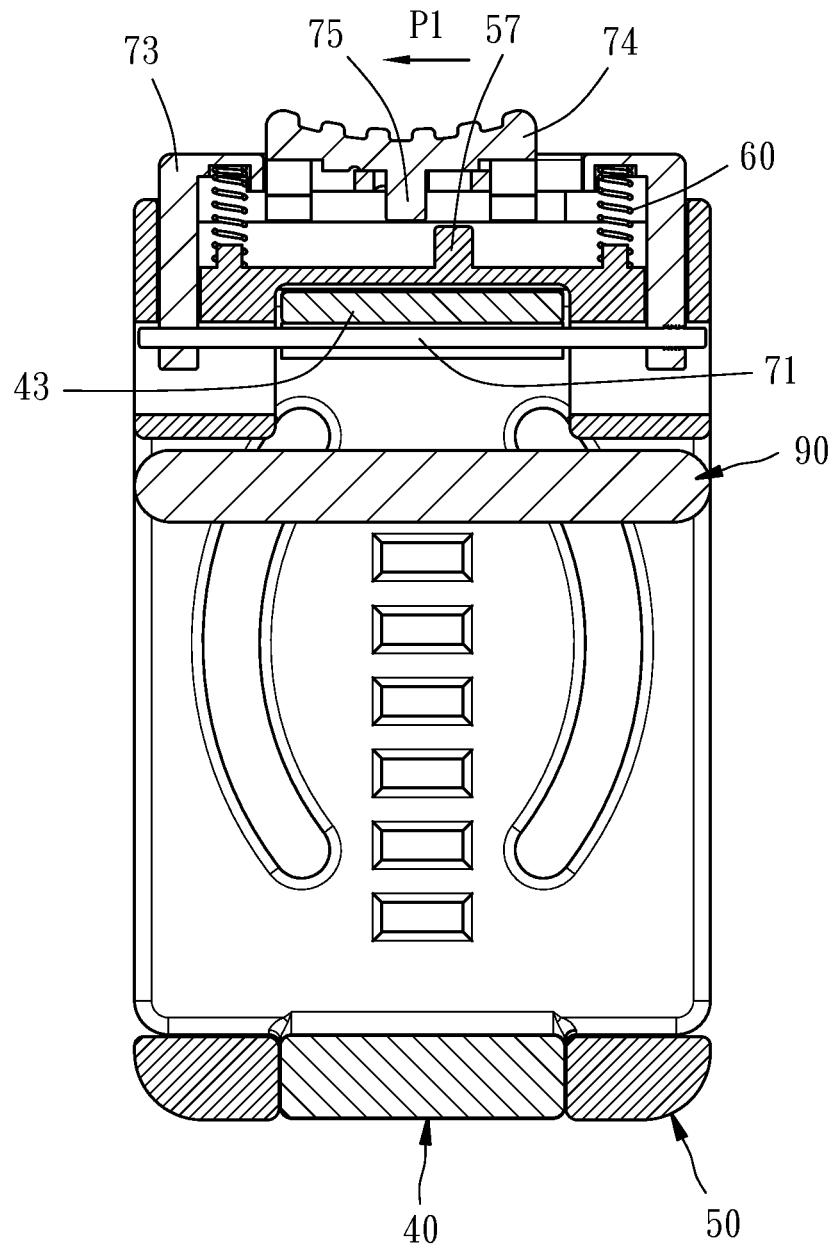
FIG. 4 is another cross-sectional view of the preferred embodiment of the present invention.
Figure 5:
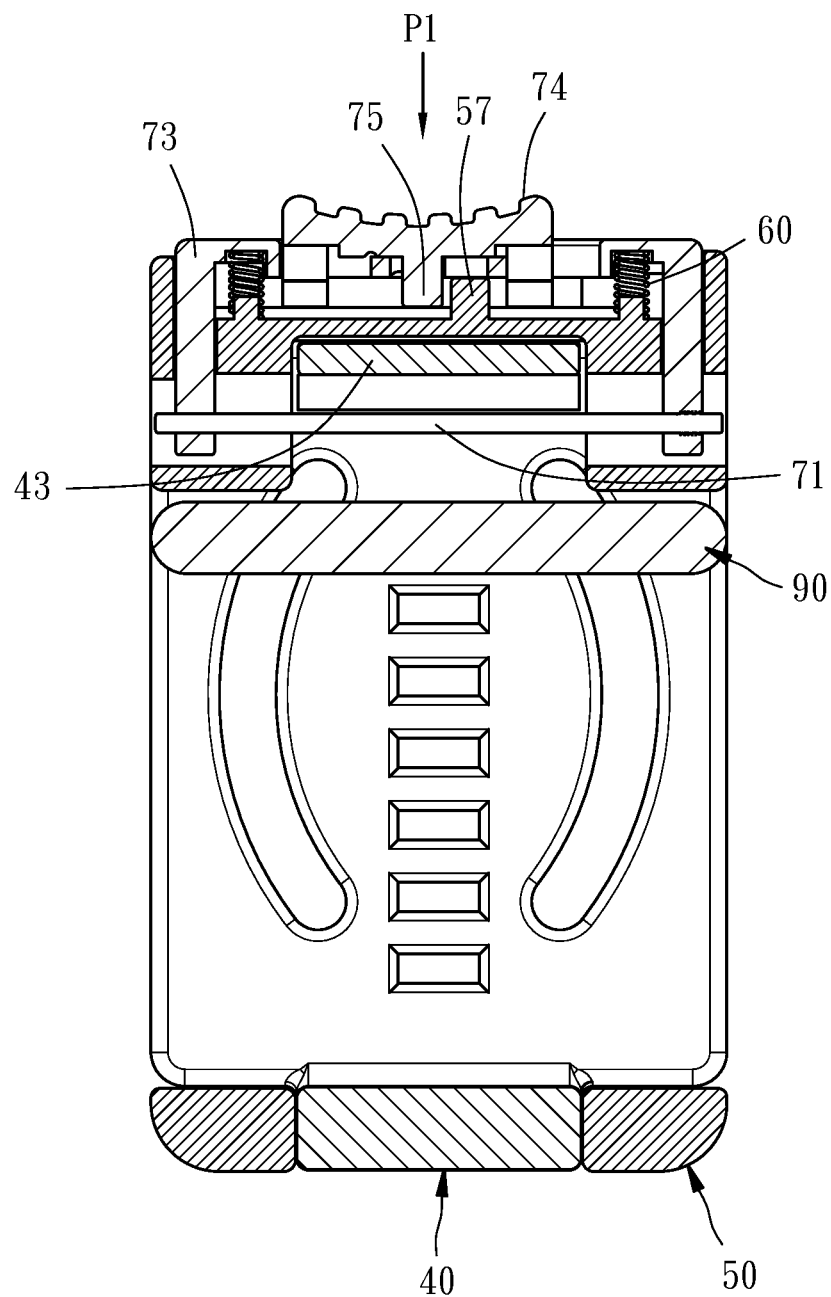
FIG. 5, similar to FIG. 4, shows an operational scenario of the preferred embodiment of the present invention.

As shown in FIG. 4 and FIG. 5, when the switch 74 has shifted to the first position P1, the second stopper 75 is staggered against the first stopper 57, so the linking member 73 is allowed to be pressed downward to push the fastener 71 down, making the fastener 71 of the lock assembly 70 disengage from the fastener 43 of the first arm 40. At this time, the first arm 40 and the second arm 50 can be drawn open.

Figure 6:
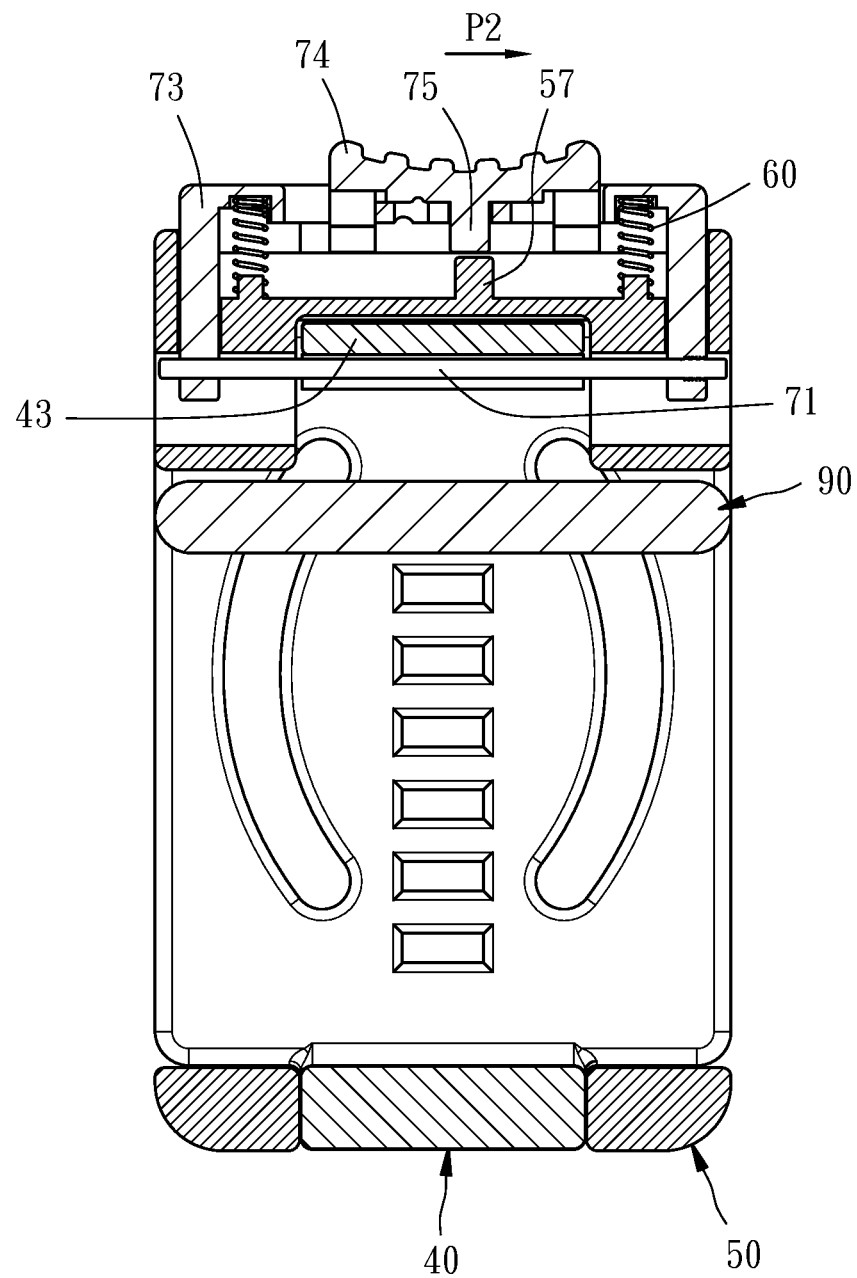
FIG. 6, similar to FIG. 4, shows another operational scenario of the preferred embodiment of the present invention.

Referring to FIG. 6, when the switch 74 has shifted to the second position P2, the second stopper 75 is aligned with the first stopper 57, so the linking member 73 is prevented from being pressed downward to push the fastener 71 down. At this time, the engagement between the fastener 71 of the lock assembly 70 and the fastener 43 of the first arm 40 is secured, and the first arm 40 and second arm 50 are locked from being drawn open.

Thus, by easy operation of the switch 74, the engagement between the fastener 71 of the lock assembly 70 and the fastener 43 of the first arm 40 can be locked and secured.

In addition to the configuration as described above, the present invention may be realized with modifications.

For example, the switch 74 may be configured as being rotatable (not shown) instead of being shiftable so as to meet practical needs.

Alternatively, the shift of the switch 74 may be performed in the transverse direction, in the axial (vertical) direction, or in the front-rear direction, without limitation.

Moreover, the switch 74 may be further equipped with extra lock to provide additional locking and unlocking effects, so as to secure the use even better.

All of the modifications may be combined in any manner to achieve the objective of the present invention.

To sum up, the disclosed clipping device can effectively secure the engagement between the fastener of the lock assembly and the fastener of the first arm, thereby reliably controlling the possibility of opening the first arm 40 and the second arm 50, thus being a novel device satisfying the objective of the present invention.

What is claimed is:

1. A clipping device, comprising:
   a first arm, having a body portion that includes a connecting portion and a fastener at two ends thereof, respectively;
   a second arm, having a body portion that includes a connecting portion and a fastener receiving portion at two ends thereof, respectively, wherein said connecting portion is connected to said connecting portion of the first arm; and
   a lock assembly, having a fastener movably engaged with said fastener of the first arm, and a switch configured to shift between a first position and a second position, wherein when said switch is at the first position, said fastener of the lock assembly is displaceable, and when said switch is at the second position, said fastener of the lock assembly is not displaceable;
   wherein said second arm further comprises a first stopper, and said switch further comprises a second stopper, so that when said switch is at the first position, said second stopper and said first stopper are staggered against each other and when said switch is at the second position, said second stopper and said first stopper are aligned with each other;
   wherein said fastener-receiving portion of the second arm forms a receiving recess and said lock assembly is installed in said receiving recess;
   wherein said lock assembly has a linking member that when driven drives said fastener of the lock assembly to move, and said switch is shiftably mounted on said linking member;
   wherein the clipping device further comprises two springs stopped between the fastener-receiving portion of the second arm and the linking member of the lock assembly;
   wherein the first stopper, the switch and the second stopper are located between the two springs;
   wherein the second arm has a circumferential wall surrounding the receiving recess;
   wherein the first stopper is provided on a bottom surface of the receiving recess;
   wherein the linking member has a cap located within the circumferential wall; and
   wherein the second stopper is located below the cap.

* * * * *